United States Patent [19]

Whiteside

[11] Patent Number: 4,636,348
[45] Date of Patent: Jan. 13, 1987

[54] SYSTEM FOR THERMOFORMING ARTICLES SUCH AS PICNIC PLATES IN A PAIR OF SIMULTANEOUSLY FED, CONTINUOUS THERMOPLASTIC WEBS WHICH SUBSEQUENTLY MOVE INTO NESTED RELATION, AND THEN DUALLY TRIMMING THE NESTED ARTICLES FROM THE WEBS

[75] Inventor: Robert C. Whiteside, Harrison, Mich.

[73] Assignee: John Brown Inc., Beaverton, Mich.

[21] Appl. No.: 702,638

[22] Filed: Feb. 19, 1985

[51] Int. Cl.$^4$ .................. B29C 51/10; B29C 51/20
[52] U.S. Cl. .................................... 264/544; 264/545;
264/551; 264/553; 264/153; 264/297.4;
264/297.5; 425/302.1; 425/339; 425/341;
425/342.1
[58] Field of Search ............... 264/544, 551, 553, 545,
264/153, 297.4, 297.5; 425/296, 302.1, 339, 341,
425/342.1

[56] References Cited
U.S. PATENT DOCUMENTS 2,518,565  8/1950  Nicolle ................................. 425/339
3,767,501 10/1973  Thiel ................................... 156/199
4,427,476  1/1984  Beck et al. ........................ 425/341 X

FOREIGN PATENT DOCUMENTS 71716  1/1960  France ................................ 264/545

Primary Examiner—Jan Silbaugh
Attorney, Agent, or Firm—Learman & McCulloch

[57] ABSTRACT

A system for producing generally concavo-convex synthetic plastic containers and like articles, such as picnic plates wherein a mold station has a stationary intermediate mold with projecting male mold parts on one side and directly opposite recessed female mold cavities in alignment therewith on the other side. A first movable mold, on the side of the intermediate mold having the male mold parts is provided with recessed mating female mold cavities of the same dimensions as the said cavities in the intermediate mold and a second movable mold on the other side of the intermediate mold has aligned projecting male mold parts mating with the cavities in the intermediate mold. A pair of heated, moldable synthetic plastic webs are advanced in unison to opposite sides of the intermediate mold and are later removed in unison from the mold station. The heated sections of the webs are moved in unison to opposite sides of the intermediate mold when the said first and second movable molds are separated therefrom. Then the first and second movable molds are driven toward the intermediate mold to thermoform identical products in both of the webs. After this, the first and second movable molds are moved away from the intermediate mold and the webs are indexed to remove the products formed from the mold station. The webs are converged toward one another after leaving the mold station to nest the aligned articles formed in the respective webs in pairs and then pairs of the nested articles are punched from the webs in a single relative movement of a punch and severing die.

16 Claims, 8 Drawing Figures

SYSTEM FOR THERMOFORMING ARTICLES SUCH AS PICNIC PLATES IN A PAIR OF SIMULTANEOUSLY FED, CONTINUOUS THERMOPLASTIC WEBS WHICH SUBSEQUENTLY MOVE INTO NESTED RELATION, AND THEN DUALLY TRIMMING THE NESTED ARTICLES FROM THE WEBS

FIELD OF THE INVENTION

This invention relates to a process for the production of thin-walled, single ply plastic articles such as picnic plates and the like on a high production basis.

BACKGROUND OF THE INVENTION

Known prior proposed machinery is disclosed in the following listed U.S. Pat. Nos.:

| | | | |
|---|---|---|---|
| 3,657,044 | Singer | 4,308,005 | Zundel |
| 3,767,501 | Thiel | 4,383,954 | Rider, Jr. |
| 4,289,469 | Keim | 4,427,476 | Beck et al |
| 4,302,415 | Lake | | |

Both the patents to Thiel U.S. Pat. No. 3,767,501 and Beck et al U.S. Pat. No. 4,427,476, which are believed the only two worthy of specific mention, disclose methods for forming double-walled plastic articles, such as cups which are to have thermal insulating properties, and comprise an outer jacket and an inner liner sized to fit within the jacket. In the Thiel patent, a multiplicity of jackets and liners are formed simultaneously in a single thermoplastic, synthetic web, or jackets and liners are separately formed in different webs at separate molding stations. Later, the webs containing the batches of jackets and liners are trimmed to separate the articles formed from the webs, and the trimmed jackets and liners are individually paired, internested, and joined by way of heat welding the peripheral area surrounding the cup mouths.

In the Beck et al patent, a pair of webs are fed through heating means to raise the temperature of the material to a thermoforming and orientation temperature and then move to a mold station wherein a mold assembly functions alternately to form a plurality of containers in one web, while permitting the stripping of another web from the molding apparatus. In other words, while one web is stationarily clamped between the closed units of one of the mold unit sets and is being molded, the other web is being advanced to remove the newly formed articles from the other of the mold unit sets, and move a heated, deformable new section into molding position. Thereafter the container cup and barrier cup are paired and internested, and the portions of the webs surrounding the mouths of the internested parts of the container are suitably bonded together, and then may be blanked from the webs to provide a double-walled container.

SUMMARY OF THE INVENTION

The method and apparatus utilized in the present invention differs conceptually in that the invention to be described is concerned with the high-speed production of discrete, single ply articles of the same size, which are thermoformed in a pair of webs simultaneously (rather than alternately) at a single mold station (rather than a pair of mold stations), and then internested and dually punched out in a single punching stroke.

One of the prime objects of the present invention is to provide a method and apparatus for forming single ply articles wherein a pair of heated thermoplastic webs are fed to opposite sides of an intermediate mold member which is stationary with respect to a pair of end mold members which move toward and away from the intermediate mold in unison, so that articles can be formed at a single mold station at double the previous rate.

Still another object of the invention is to provide a method and apparatus of the character described for forming single ply articles, such as picnic plates and the like, wherein male mold members are provided on one side of the intermediate mold and axially aligned female mold cavities are provided on the opposite side of the intermediate mold such that, when the two webs are simultaneously indexed to remove the formed articles from the mold station, the articles formed in the respective sheets are in axial alignment and can be brought into nested relationship prior to feeding the webs through a trim press, wherein the internested articles are dually separated from the webs simultaneously in a single punch stroke.

Still another object of the invention is to provide an apparatus and method which achieves dual trimming of the nested webs and does not slow the production process.

Another object of the invention is to provide a method and apparatus for forming single ply plastic articles, wherein the webs may be transferred from the thermoforming machine to the trim press in continuous form, and wherein it is unnecessary to sever the web sections prior to feeding them to a trim press.

Still a further object of the invention is to provide a highly reliable and efficient system for forming single walled articles in synthetic plastic foam, or non-foam, sheets having a thickness in the range of 0.009 to 0.050 of an inch.

Other objects and advantages of the invention will become apparent by reference to the following specification and to the drawings.

IN THE DRAWINGS

FIG. 1A is an enlarged, fragmentary, schematic, sectional side elevational view of the portion A of the FIG. 1 apparatus;

FIG. 1B is an enlarged, fragmentary, schematic, sectional side elevational view of the portion B of the FIG. 1 apparatus;

FIG. 1C is an enlarged, fragmentary, schematic, sectional side elevational view of the portion C of the FIG. 1 apparatus;

FIG. 1D is an enlarged, fragmentary, schematic, sectional side elevational view of the portion D of the FIG. 1 apparatus;

DETAILED DESCRIPTION

Figure 1:
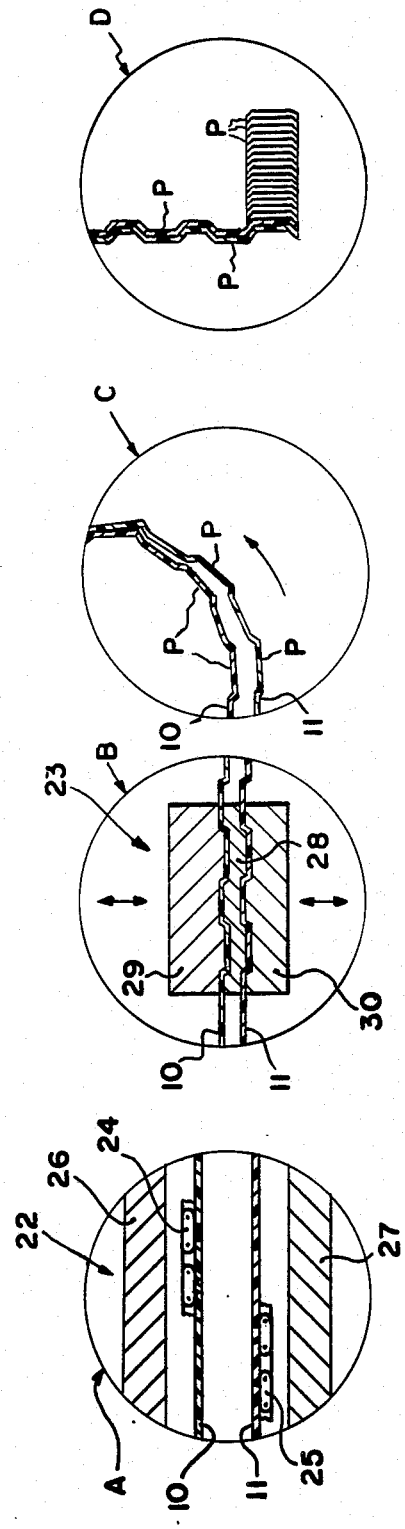
FIG. 1 is a schematic, side elevational view of apparatus for carrying out the production method which will be described, the figure incorporating encircled enlargements which illustrate the various steps which are performed.

Referring now more particularly to FIG. 1 in the first instance, a pair of continuous strip-like sheets or webs 10 and 11 of thermoplastic, moldable, synthetic plastic material are shown as being unwound incrementally from a pair of rolls 12 and 13 respectively, which are rotatably mounted on spindles 14 and 15 provided on a roll stand 16. The stand 16 is disclosed as also supporting replacement rolls of material 17 and 18 on spindles or arbors 19 and 20.

Typically, but not exclusively, the identical webs 10 and 11 may be a polyolefin material such as polyethylene or polypropylene in foam, or non-foam, form. However, hosts of other well-known thermoplastic materials, including polystyrenes, polycarbonates and others may also be employed, in the thin-walled thickness which provides sufficient flexibility in the peripheral edge portions of the plates formed to permit dual trimming.

The thermoforming machine, generally designated 21 in FIG. 1, includes a heating station generally designated 22, and a mold station generally designated 23. Webs 10 and 11 proceed up over guides 21a and 21b. While the invention will be disclosed as involving heating apparatus 22, it is to be understood that the heated extrudate from an extruder and the mechanism for advancing it to the mold station may be utilized, such as disclosed in Thiel U.S. Pat. No. 4,105,386, which is incorporated herein by reference. Thus, alternatively, extruders may be employed, as disclosed in the aforementioned U.S. Pat. No. 4,105,386, to provide a pair of heated sheets to the mold station 23.

Also incorporated herein by reference, are the present assignee's U.S. Pat. Nos. 3,346,923 and 3,216,491 which disclose conventional thermoforming machines. U.S. Pat. No. 3,216,491 discloses web advancing chains of the type wherein the links of the chains are provided with web edge penetrating pins. Such advancing chains for the webs 10 and 11 are disclosed respectively at 24 and 25 in the encircled, blown up area designated A in FIG. 1. The indexing chains 24 and 25 (which preferably are driven by the same electric motor) are operative to move the plastic sheets 10 and 11 in unison incrementally to the molding station 23. Banks of conventional electrically powered heaters 26 and 27 are provided for heating the sheets 10 and 11 respectively, and, as usual, are provided to heat the mid-portions of the webs 10 and 11 to molding temperature while leaving their side edges relatively cool.

In U.S. Pat. No. 3,346,923, the plastic web is shown as being indexed in increments of travel separated by periods of dwell during which molding takes place and the thermoformer disclosed at 21 is typical in this respect. The encircled area B in FIG. 1 schematically depicts the mold assembly used at the mold station 23, which comprises a stationary intermediate mold 28, on opposite sides of which are upwardly and downwardly movable upper and lower molds 29 and 30. The intermediate mold 28 is stationary with respect to molds 29 and 30, and may be fixed to the frame 31 of the thermoforming machine at the thermoforming station 23.

The upper and lower molds 29 and 30 are mounted on platens 32 and 33, respectively, and may be moved toward and away from the intermediate mold 28 in unison by the mechanisms disclosed in U.S. Pat. No. 3,346,923, or the present assignee's U.S. Pat. No. 4,377,377, also incorporated herein by reference. For the sake of simplicity, platens 32 and 33 are shown as operated by hydraulic cylinders 34 and 35, respectively, which have piston rods 34a and 35a which connect to the platens 32 and 33 respectively. As both FIGS. 1 and 2 disclose, the intermediate mold 28 is provided on its upper face with picnic-plate-shaped cavities 36, and directly opposite and axially aligned therewith, on its lower side, with projecting, mating male mold parts 37. Male parts 37', identical to the male parts 37 and also in axial alignment therewith, are provided on the lower face of the mold 29. Likewise, female mold cavities 36', identical in dimension with the cavities 36, are provided in the upper face of the lower mold 30 in axial alignment with the cavities 36 and with the male mold parts 37 and 37'. While the molds, as disclosed, show only configurations which will produce four plates at a time, it is to be understood that, in practice, the molds will be of sufficient size to produce many more plates, and will have a plurality of additional cavities 36, 36' and mating parts 37, 37'.

As illustrated, the mold station is of the differential pressure type, but it is to be understood the invention also contemplates matched mold forming of the type in which a differential pressure is not employed to assist the molding operation. Illustrated here in the intermediate mold is a manifold 38, connected via a suitable vacuum line 39, with a vacuum pump or the like through a valving system 40 which is operative to communicate, or discommunicate, the manifold 38 with a vacuum pump. Ports 41 are provided in the usual manner to connect the manifold 38 with the cavities 36, and male mold parts 37.

In the upper mold 29, an air pressure manifold 42 is provided to supply air under pressure to the male mold parts 37' via air ports 43. An air pressure line 44 connects the manifold 42 with a suitable compressor or the like through a valving system 45 which communicates, or discommunicates, the air pressure source from the manifold 42. Similarly, the lower mold 30 has an air manifold 46 communicating with the cavities 36' via ports 47. An air line 48 leads to a suitable source of air under pressure, such as a compressor connected with an accumulator tank, and a valve system 49 functions to communicate, or discommunicate, the line 48 and manifold 46. Valve systems 40, 45, and 49 are opened, when the cylinders 34 and 35 are activated to move the molds 29 and 30 to engage the plastic webs 10 and 11, and are closed, when the molding operation has taken place, and the double acting cylinders 34 and 35 are activated to remove the molds 29 and 30 to the separated position in which they are shown in FIG. 2.

Figure 4:
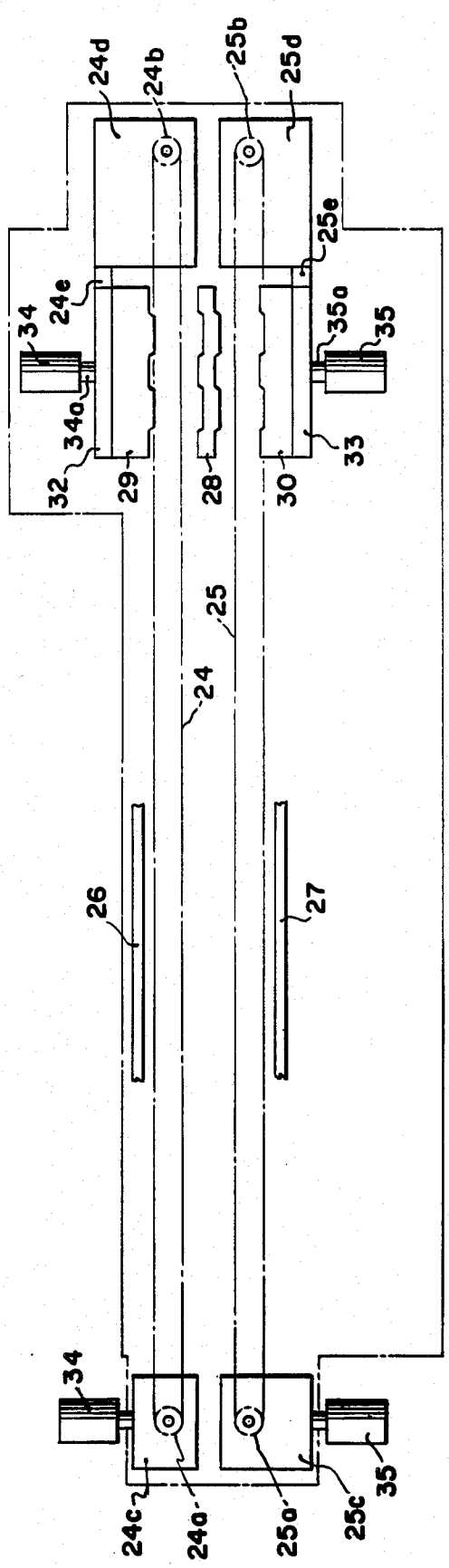
FIG. 4 is a schematic, side elevational view showing a typical advancing chain assembly.

FIG. 4 schematically shows the typically endless chain assemblies with web-piercing pins. For purposes of simplification, I have shown end sprockets 24a and 24b for chain 24 as supported on frames 24c and 24d at opposite ends of the thermoforming machine. The frame 24d is connected as at 24e to platen 32 and cylinders 34 are simultaneously operated to move the chain 24 vertically with platen 32. Similarly, end sprockets 25a and 25b for chain 25 may be supported on frames 25c and 25d, respectively. The frame 25d is connected as at 25e to platen 33 and cylinders 35 are simultaneously operated to move the chain 25 vertically with platen 33.

Figure 2:
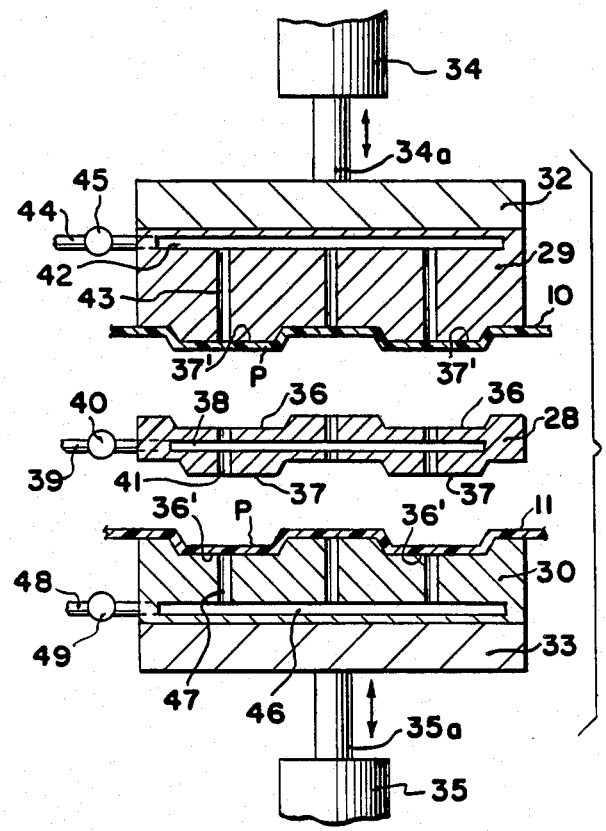
FIG. 2 is a considerably enlarged, schematic, sectional elevational view illustrating the molding operation, the movable molds being shown as having been withdrawn following a molding operation.

When molds 29 and 30 reach the separated position, the plastic sheets 10 and 11 have been separated from the intermediate mold 28 by the vertical retraction of chains 24 and 25 and the chains can then be driven to index the plastic sheets 10 and 11 to a position such that the plates P formed therein are removed from left to right in FIG. 2, to a position to the right of the molds 29, 30, out of the mold station 23. This position of each web 10 and 11 is illustrated in encircled area C, wherein the continuous sheets 10 and 11, with the plates P formed therein at spaced intervals, are shown as moving toward nested relationship. This movement of the webs 10 and 11 is accomplished by leading both sheets in vertically juxtaposed position over a trim press guide canopy 52 of the type, for instance, disclosed in the present assignee's U.S. Pat. Nos. 3,461,760 and 4,173,161, both of which are also incorporated herein by reference. Because the webs 10 and 11 are thereby caused to follow a convergent path, internesting of the webs 10 and 11 and the plates P formed therein occurs naturally.

Figure 3:
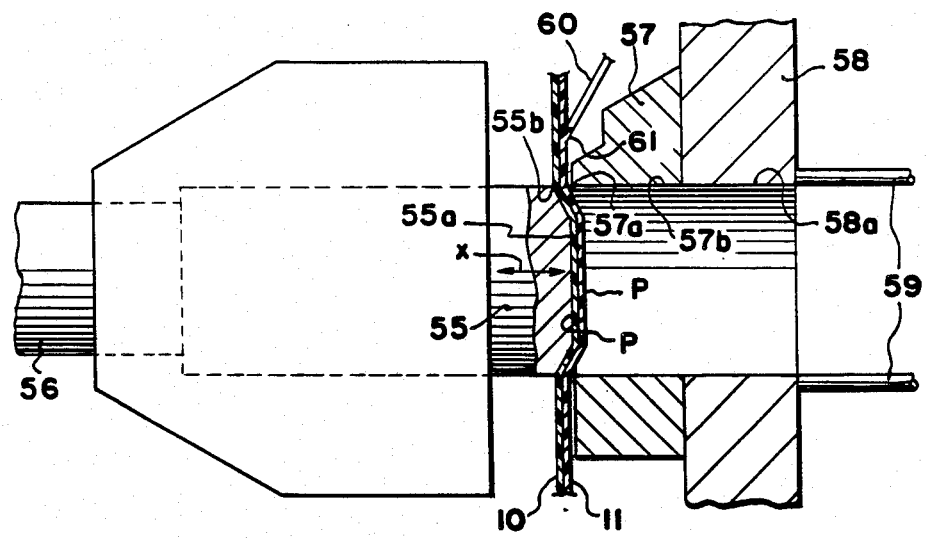
FIG. 3 is a still more enlarged, schematic, sectional elevational view, illustrating the dual trimming operation which is performed, the punch being shown as moving forwardly to trim a plate from each web.

FIG. 3 schematically illustrates the operation of the punch 55, which has a front face 55a configured to the shape of the male mold parts 37, surface 55a having a sharpened peripheral edge 55b. Punch 55 may be considered to be reciprocated, as indicated by the arrows x, in the manner disclosed in U.S. Pat. No. 4,173,161 via its connection to connecting rod 56.

Punch 55 cooperates in the usual manner with a ring-shaped, trim die 57, which is fixedly mounted on the frame 58 of the trim press, and has a sharpened peripheral edge 57a cooperating with the edge 55b. The severed plates P are pushed by the continuous operation of punch 55 from left to right through the opening 57b in the trim die 57, and on into an opening 58a provided in frame member 58 to guide rods 59 which lead to a suitable discharge mechanism. The encircled area D in FIG. 1 indicates what is accomplished.

As is usual, the juxtaposed sheets 10 and 11 are fed to a position between punch 55 and die 57 in a step-by-step movement through vertical sheet guides fixedly mounted by a treadle which is horizontally reciprocated with the punch at a proportionate speed. Feed fingers 60, as disclosed in U.S. Pat. No. 4,173,161, or in applicant's assignee's U.S. Pat. No. 4,380,183, are mounted on the treadle to engage tabs 61 on the web 11 and advance the nested webs vertically to the die 57 in step-by-step movement synchronized with the stroke of the punch 55.

THE OPERATION

Assuming the molds at the mold station 23 are in the separated position, shown in FIG. 2, in which the forming operation has just been completed, the machine controls are operated via a suitable microprocessor or the like, to discommunicate the manifold 38 from the vacuum line 39 via valve system 40. In this position of platens 32 and 33 the chains 24 and 25 have been retracted with molds 29 and 30 respectively, to remove the webs 10 and 11 from mold 28. The valve systems 45 and 49 open to provide ejection air to upper and lower molds 29 and 30. Once the air ejection of the plates P is accomplished, after a suitable time for cooling to rigidify the plates P formed, the mechanisms driving chains 24 and 25 are energized to advance the sheets 10 and 11 from left to right in FIG. 2 an increment sufficient to dispose the plates P formed in the webs 10 and 11 to the right of mold station 23. At the same time, a new section of each of the sheets 10 and 11, which has been heated at the forming station 22, has been advanced to a position between the molds 29 and 30. In unison with this advancing movement of webs 10 and 11, the advancing finger assembly 60 moves the nested sheets 10 and 11 an increment downwardly to dispose a pair of internested, non-severed plates P between the punch 55 and trim die 57. With sheets 10 and 12 in a state of dwell, the punch 55 is moved by the connecting rod 56 from left to right in FIG. 3, to simultaneously punch out the pair of internested plates P, and is then returned to original position.

Also, during the dwell of sheets 10 and 11, cylinders 34 and 35 are operated to move the molds 29 and 30 and chains 24 and 25 toward the intermediate die 28 and the unformed sections of heated plastic webs 10 and 11 which are disposed adjacent the opposite sides of intermediate die 28. At this time, valve system 40 is energized to communicate the vacuum line 39 with the manifold 38. Valve systems 49 and 45 communicate the air lines 44 and 48 with the manifolds 42 and 46 respectively. As the dies 29 and 30 close completely to the die 28, the differential pressure created assists in deforming the plastic sheets 10 and 11 in the manner indicated in FIG. 2 to mold plates P therein.

It is to be understood that the dies 29, 28 and 30 are the usual water cooled dies. After a short period to permit cooling, the cylinders 34 and 35 are operated in a return direction to move the dies 29, 30 and chains 24 and 25 to the separated position once again.

While one embodiment of the invention has been described in detail, it will be apparent to those skilled in the art that the disclosed embodiment may be modified. Therefore, the foregoing description is to be considered exemplary rather than limiting, and the true scope of the invention is that defined in the following claims.

What is claimed is:

1. In an improved synthetic plastic article production system for producing products such as picnic plates at increased rates; a frame; a mold station supported thereby and incorporating an intermediate mold having projecting male mold parts on one side and directly opposite, recessed female mold cavities on its opposite side of the same configuration; a first movable end mold on the side of the intermediate mold having the male mold parts and having recessed female mold cavities aligned and dimensioned to mate therewith; a second movable end mold on the side of the intermediate mold having the recessed female mold cavities and having projecting male mold parts aligned and dimensionsed to mate therewith; mechanism for advancing a pair of heated, moldable synthetic plastic webs in unison to move moldable sections thereof to opposite sides of the intermediate mold, and for later removing them in unison from the mold station; drive mechanism for moving each of said first and second end molds toward the intermediate mold and conforming said portions of the webs to the female cavities and male parts of the intermediate mold, and for separating said first and second movable end molds from the intermediate mold; mechanism for converging said webs toward one another after they have been removed from the mold station to nest the products formed in the two webs; and trim mechanism including a relatively movable punch and trim die assembly operable for severing the nested products from the nested webs simultaneously with a single punching stroke.

2. The invention defined in claim 1 wherein said punch and trim die assembly includes a relatively reciprocable punch and die ring which, in one position, are axially spaced apart, and in another position are in a configuration in which the punch is received within the die ring; and feed mechanism is employed for advancing the engaged webs with their nested products incrementally to successively dispose the nested products formed in the webs in axial alignment with the punch and die ring when the latter are in spaced apart position.

3. The invention defined in claim 2 wherein the webs are synchronously moved incrementally to and from the mold station, and to and from the punch and trim die assembly, in unison.

4. The invention defined in claim 1 wherein means is provided downstream from the mold station to converge said webs and nest the products formed.

5. The invention defined in claim 1 wherein means is incorporated with the said intermediate mold and vertically mating movable end molds for creating a differential pressure on opposite sides of each of the plastic webs.

6. The invention defined in claim 1 wherein means is incorporated with the intermediate mold for air pressure ejecting each of the molded webs from the intermediate mold.

7. The invention defined in claim 1 wherein said mechanism for advancing the webs is mounted to move toward and away from said intermediate mold with said first and second end molds.

8. In an improved synthetic plastic article production system for producing products such as picnic plates; a frame; a mold station supported thereby and incorporating an intermediate mold having projecting male mold parts on one side and conforming female mold cavities on its opposite side; a first movable end mold on the side of the intermediate mold having the male mold parts and having recessed female mold cavities aligned and dismensioned to mate therewith; a second movable end mold on the side of the intermediate mold having the recessed female mold cavities and having projecting male mold parts aligned and dimensioned to mate therewith; mechanism for disposing portions of a pair of heated, moldable synthetic plastic webs on opposite sides of the intermediate mold, and for later removing them from the mold station; drive mechanism for moving each of said first and second end molds toward the intermediate mold and conforming said portions of the webs to the female cavities and male parts of the intermediate mold, and for separating said first and second movable end molds from the intermediate mold; mechanism for converging said webs toward one another after they have been removed from the mold station to nest the products formed in the two webs; and trim mechanism including a relatively movable punch and trim die assembly operable for severing the nested products from the nested webs simultaneously with a single punching stroke.

9. The invention defined in claim 8 in which said disposing mechanism includes an endless pin chain mounted to move toward and away from the intermediate mold with each end mold.

10. A method of producing generally concavo-convex synthetic plastic containers and like articles, such as picnic plates, in apparatus comprising: a mold station having a stationary intermediate mold with projecting male mold parts on one side and directly opposite recessed female mold cavities in alignment therewith on the other; a first movable mold, on the side of the intermediate mold having the male mold parts, provided with recessed mating female mold cavities of substantially the same dimensions as the said cavities in the intermediate mold; a second mold on the other side of the intermediate mold having aligned projecting male mold parts mating with the cavities in the intermediate mold; mechanism for supplying a pair of heated, moldable synthetic plastic webs in unison on opposite sides of the intermediate mold and for later removing them in unison from the mold station; drive mechanism for moving each of said first and second movable molds toward the intermediate mold and molding the articles, and for separating said first and second movable molds from the intermediate mold; and a punch and severing die; the steps of:

moving heated sections of the webs in unison to opposite sides of the intermediate mold when the said first and second movable molds are separated therefrom; moving the first and second movable molds to the intermediate mold to thermoform conforming products in both of the webs; moving the first and second movable molds away from the intermediate mold and indexing the webs in unison to remove the products formed from the mold station, converging the webs toward one another to nest the aligned articles formed in the respective webs in pairs; and punching pairs of the nested articles from the webs in a single relative movement of the punch and severing die.

11. The method of claim 10 wherein a differential pressure is created on opposite sides of said sections of both webs when the said first and second end molds are moved toward the intermediate mold.

12. The method of claim 10 wherein the webs are passed through a heating station upstream from the mold station.

13. The method of claim 10 wherein the webs are converged by leading them up over a curvilinear canopy and down in non-severed continuous condition to a location in which products formed therein are in axial alignment with said punch and severing die and sections of the webs just upstream from the punch and severing die are engaged and advanced during periods of feed separated by periods of dwell in timed sequence with the movement of other sections of the same webs in unison to the mold station.

14. The method of claim 13 wherein the sections of the webs being fed to the opposite sides of the intermediate die move in unison with the sections of the webs being advanced to the punch and severing die.

15. The method of claim 10 wherein the webs are separated from the intermediate mold at the time of separation of the end molds from the intermediate mold.

16. The method of claim 15 wherein the mechanism for supplying the pair of webs is moved with the end molds to effect the separation.

* * * * *